(12) United States Patent
Oddie (10) Patent No.: US 7,707,898 B2
(45) Date of Patent: May 4, 2010

(54) OPEN BORE TURBINE FLOWMETER

(75) Inventor: Gary Oddie, St. Neots (GB)

(73) Assignee: Schlumberger Technology Corporation, Cambridge, MA (US)

( * ) Notice: Subject to any disclaimer, the term of this patent is extended or adjusted under 35 U.S.C. 154(b) by 68 days.

(21) Appl. No.: 12/189,625

(22) Filed: Aug. 11, 2008

(65) Prior Publication Data
US 2009/0038410 A1    Feb. 12, 2009

(30) Foreign Application Priority Data
Aug. 11, 2007   (GB)  ................. 7015701.9

(51) Int. Cl.
*G01F 1/10*   (2006.01)
*G01F 1/28*   (2006.01)

(52) U.S. Cl. .................. 73/861.92; 73/861.74
(58) Field of Classification Search ........... None
See application file for complete search history.

(56) References Cited

U.S. PATENT DOCUMENTS 5,138,888 A    8/1992   Walmer, Sr.
5,197,228 A *  3/1993   Sharkey et al. ............... 451/5

FOREIGN PATENT DOCUMENTS

| CA | 2352673 A1 | 1/2003 |
|----|------------|--------|
| EP | 1561899 A1 | 8/2005 |
| EP | 1767907 A2 | 3/2007 |
| FR | 2356144 A1 | 1/1978 |
| JP | 2007178245 A | 7/2007 |

OTHER PUBLICATIONS

Baker: "Turbine and related flowmeters", Flow Measurement Handbook. Industrial designs, operating principles, performance, and applications, Cambridge University Press, 2000, pp. 216-252.
Oddie et al: "Flow-rate measurement in two-phase flow", Annual Review of Fluid Mechanics, vol. 36, 2004, pp. 149-172.

* cited by examiner

*Primary Examiner*—Harshad Patel
(74) *Attorney, Agent, or Firm*—James McAleenan; Vincent Loccisano; Brigid Laffey (57) ABSTRACT

According to the invention, a system for determining at least one property of a fluid flow through a conduit is disclosed. The system may include a bearing, at least one blade member, and a monitoring device. The bearing may be coupled with an interior of the conduit, and may include an inner race, where the inner race may rotate. The blade members may be coupled with the inner race, and may extend from the inner race toward the interior of the conduit. The blade members may rotate when a fluid flows through the interior of the conduit, and the inner race of the bearing may rotate when the blade members rotate. The monitoring device may be configured to determine a rate of rotation of the blade members. At least one property of the fluid flow may be determined based at least in part on the rate of rotation.

18 Claims, 9 Drawing Sheets

OPEN BORE TURBINE FLOWMETER

BACKGROUND OF THE INVENTION

This invention relates generally to instruments for monitoring fluid flows. More specifically the invention relates to instruments for monitoring fluid flows in conduits which may also allow an object to pass through the instrument.

In certain applications where a fluid flow rate must be determined for a flow through a conduit (or other related properties such as fluid velocity and mass flow rate), access through the bore of the conduit before, during, or after fluid flow rate determination may be desirable for additional testing and/or other operations. Flow meters known in the art often consume so much space within the bore of the conduit where the flow is to be measured, that the ability to operate other testing equipment within the bore of the conduit is heavily impaired, if not impossible. Time and other resources may be lost removing the flow meter from the bore of the conduit before other testing and/or operations may proceed.

Additionally, because flow meters known in the art consume so much space within the bore of the conduit where the flow is to be measured, these flow meters are subject to all of the consequences of such total exposure to the monitored fluid flow. For example, solid particles in the fluid flow may impair operation of such flow meters, potentially causing damage. Additionally, high flow rates may work to destroy rigid portions of the flow meter to relieve increased pressure in the fluid flow due to the presence of the flow meter.

BRIEF DESCRIPTION OF THE INVENTION

In one embodiment of the present invention, a system for determining at least one property of a fluid flow through a conduit is provided. The system may include a bearing, at least one blade member, and a monitoring device. The bearing may be coupled with an interior of the conduit, and may include an inner race, where the inner race rotates with respect to the conduit. The at least one blade member may be coupled with the inner race of the bearing, and may extend from the inner race of the bearing toward the interior of the conduit. The at least one blade member may rotate with respect to the conduit when a fluid flows through the interior of the conduit, and the inner race of the bearing may rotate with respect to the conduit when the at least one blade member rotates. The monitoring device may be configured to determine a rate of rotation of the at least one blade member with respect to the conduit, where at least one property of the fluid flow may be determined based at least in part on the rate of rotation of the at least one blade member with respect to the conduit.

In another embodiment, a method for determining at least one property of a fluid flow through a conduit is provided. The method may include providing a bearing having an inner race, where the bearing is coupled with an interior of the conduit. The method may also include providing at least one blade member, where the at least one blade member may be coupled with the inner race of the bearing, and may extend from the inner race of the bearing toward the interior of the conduit. The method may further include rotating the at least one blade member with the fluid flow through the conduit. The method may moreover include determining a rate of rotation of the at least one blade member with respect to the conduit. The method may additionally include determining at least one property of the fluid flow based at least in part on the rate of rotation of the at least one blade member with respect to the conduit.

In another embodiment, a system for determining at least one property of a fluid flow through a conduit is provided. The system may include a first means, a second means, and a third means. The first means may be for converting a substantially linear motion of the fluid flow to a rotational motion. The second means may be for coupling the first means with an interior of the conduit. The third means may be for determining a rate of rotation of the rotational motion, where at least one property of the fluid flow may be determined based at least in part on the rate of rotation of the at least one blade member with respect to the conduit.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other components may be shown as components in block diagram form in order not to obscure the embodiments in unnecessary detail. In other instances, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not included in a figure. Furthermore, not all operations in any particularly described process may occur in all embodiments. A process may correspond to a method, a function, a procedure, etc.

In one embodiment, a system for determining at least one property of a fluid flow through a conduit is provided. In some embodiments, the system may include a bearing, at least one blade member, and a monitoring device. In one embodiment, the blade member(s) may be coupled with the inner race of the bearing, and the bearing may be coupled with the interior of the conduit. A fluid flow through the conduit may cause the blade member(s) to rotate, and the monitoring device may be configured to determine the rate of rotation of the blade member(s), possibly to determine at least one property of the fluid flow therefrom.

In a different embodiment, a system for determining at least one property of a fluid flow through a conduit is provided where the system may include at least one blade member and a torque-monitoring device. In one embodiment, the blade member(s) may be coupled with a bearing and/or the interior of the conduit and the torque-monitoring device. A fluid flow through the conduit may act on the blade member(s) so as to drive the blade member to rotate. In the embodiment, the blade member(s) may be coupled with the bearing and/or the interior of the conduit and the torque-monitoring device so as to resist/prevent the blade member(s) from rotating under the action of the fluid and the torque-monitoring device may be configured to measure the torque on the blade member(s), possibly to determine at least one property of the fluid flow therefrom.

In some embodiments, the bearing may, merely by way of example, be a sliding bearing, a roller-element bearing, a fluid bearing, and/or a magnetic bearing. In some embodiments, the bearing may have an inner race and/or an outer race. In some embodiments, the bearing may be coupled with an interior of the conduit, where the inner race rotates with respect to the conduit. In these or other embodiments, the bearing being coupled with the interior of the conduit may include the outer race of the bearing being coupled with the interior of the conduit. In other embodiments, the conduit itself may form a functional outer race for the bearing.

In some embodiments, the blade member(s) may be fabricated from a rigid and/or flexible material. In these or other embodiments, the material from which the blade member(s) are fabricated may be impact resistant, shatter-proof, wear resistant, and/or corrosion resistant. Merely by way of example, some possible blade member materials include polymers, ceramics, metals, vitreous materials, and/or composite materials. Flexible blade member(s) may allow for some fluid flow forces on the blade member(s) to be ameliorated via controlled, observed, and/or predicted deformation of the blade member(s). The effect of such controlled, observed, and/or predicted deformation may be accounted for in the systems which will determine fluid flow properties from the rotation of the blade member(s).

In some embodiments, the blade member(s) may rotate with respect to the conduit when a fluid flows through the interior of the conduit, possibly causing the inner race of the bearing to rotate with respect to the conduit. The blade member(s) may, merely by way of example, be of any shape which encourages rotation of the blade member(s) when they interact with a substantially linear fluid flow acting substantially perpendicularly to blade member(s).

In some embodiments, the blade member(s) may be coupled with the inner race of the bearing, and may extend from the inner race of the bearing toward the interior of the conduit, possibly including the substantial center of the conduit. In some embodiments, the blade member(s) may be weighted such that the load on the bearing is balanced. In these or other embodiments, weights may be coupled with the inner race of the bearing to properly balance the bearing.

In different embodiments, the blade member(s) may be coupled in different fashions with the inner race of the bearing. Merely by way of example, any particular blade member may be fixedly or movably coupled with the inner race. In some embodiments, the blade member(s) being movably coupled with the inner race of the bearing may include at least one of the blade members being hingedly coupled with the inner race of the bearing.

In some embodiments, a spring or other force-producing element may urge any given blade member toward an initial/default position. In these or other embodiments, at least one of the blade members may be coupled with a double action spring hinge, and the double action spring hinge may be coupled with the inner race of the bearing.

In some embodiments, displacement of the blade member(s) from an initial/default position may occur due to multiple causes. Merely by way of example, in some embodiments, fluid flow through the conduit may cause flexible blade member(s) to deform, or cause hingedly coupled blade member(s) to at least partially hingedly rotate.

In another example, a through-conduit object may, either by weight or applied force, cause flexible blade member(s) to deform, or cause hingedly coupled blade member(s) to at least partially hingedly rotate. In some embodiments, the blade member(s) may be configured to deform and/or hingedly rotate in either direction of the conduit from their initial/default position.

As discussed above with regard to controlled, observed, and/or predicted deformation of flexible blade member(s), hingedly coupled rigid and/or flexible blade member(s) may allow for some fluid flow forces on the blade member(s) to be ameliorated via controlled and/or predicted hinged rotation of the blade member(s). The effect of such controlled and/or predicted rotation may be accounted for in the systems which will determine fluid flow properties from the rotation of the blade member(s).

In some embodiments, the conduit may at least partially define at least one annular cavity in proximity to the blade member(s). In some embodiments, portions of the bearing may also at least partially define the annular cavity or cavities.

In embodiments with annular cavities, the blade member(s) may be configured to flex or hingedly rotate into the annular cavity or cavities. In some embodiments, the annular cavity or annular cavities may allow the blade member(s) to flex or hingedly rotate in either direction of the conduit from their initial/default position.

The monitoring device may be configured to determine a rate of rotation of the at least one blade member with respect to the conduit, where at least one property of the fluid flow may be determined based at least in part on the rate of rotation of the at least one blade member with respect to the conduit. Merely by way of example, properties which may be determined include a flow rate of the fluid through the conduit, a velocity of the fluid through the conduit, and/or a mass flow rate of the fluid through the conduit.

In some embodiments, the monitoring device being configured to determine a rate of rotation of the at least one blade member with respect to the conduit may include the monitoring device being configured to determine a rate of rotation of the inner race of the bearing with respect to the conduit. In these or other embodiments, the monitoring device may include a transducer such as a Hall Effect sensor, a potentiometer, a light source and photoresistor combination, etc.

Thus some embodiments of the invention provide systems for determining at least one property of a fluid flow through a conduit. In some embodiments, access through the conduit may also be provided for through-conduit objects. Even in the case of rigid blade member(s) (or even flexible and/or hinged blade member(s)), sufficient space may be reserved in the center of the conduit to allow through-conduit objects no greater in size than the sufficient space to pass through the system.

In different embodiments, different amounts of maximum diameter access may be provided based at least in part on the size and shape of the blade member(s), whether the bearing is recessed into the conduit wall, the flexibility of the blade member(s), whether the blade member(s) are hinged, the maximum hinge rotation, whether annular cavities are provided, and/or other factors.

In some embodiments then, the maximum diameter access which may be provided may substantially be equal to the diameter of the conduit. In some embodiments, a substantially equal access diameter may equal the maximum diameter of a through-conduit object which may traverse a length of the conduit if a system of the invention was not present. This may equal a diameter of the conduit which is not in proximity to the blade member(s) or associated features such as annular cavities.

In another embodiment, a method for determining at least one property of a fluid flow through a conduit is provided. In some embodiments, the methods implemented by any of the system embodiments explicitly or implicitly described herein are provided. In other embodiments, the methods implemented through the use of any of the system embodiments explicitly or implicitly described herein are provided.

In one embodiment, the method may include providing a bearing having an inner race, where the bearing is coupled with an interior of the conduit. The method may also include providing at least one blade member, where the blade member(s) may be coupled with the inner race of the bearing, and may extend from the inner race of the bearing toward the interior of the conduit.

The method may further include rotating the blade member(s) with the fluid flow through the conduit. The method may moreover include determining a rate of rotation of the blade member(s) with respect to the conduit. The method may additionally include determining at least one property of the fluid flow based at least in part on the rate of rotation of the blade member(s) with respect to the conduit.

In some embodiments, the method may also include providing a through-conduit object, and moving the through-conduit object into the conduit in a first direction such that at least one blade member is at least temporarily and at least partially displaced from an initial position. In some embodiments, the through-conduit object may have a width substantially equal to the diameter of the interior bore defined by the conduit.

In some embodiments, a blade member being at least temporarily and at least partially displaced from an initial position may include the blade member flexing. In these or other embodiments, a blade member being at least temporarily and at least partially displaced from an initial position may include the blade member rotating about at least one hinge.

In some embodiments, a blade member being at least temporarily and at least partially displaced from an initial position may include the blade member being at least partially disposed within an annular cavity at least partially defined by the conduit.

In another embodiment, a system for determining at least one property of a fluid flow through a conduit is provided. The system may include a first means, a second means, and a third means.

The first means may be for converting a substantially linear motion of the fluid flow to a rotational motion. In some embodiments, the first means may possibly include at least one blade member, a bearing, a hinge, and/or any subcomponent discussed herein.

The second means may be for coupling the first means with an interior of the conduit. In some embodiments, the second means may possibly include a bearing, a hinge, and/or any subcomponent discussed herein.

The third means may be for determining a rate of rotation of the rotational motion, where at least one property of the fluid flow may be determined based at least in part on the rate of rotation of the at least one blade member with respect to the conduit. In some embodiments, the third means may possibly include any of the monitoring devices discussed herein.

Figure 1:
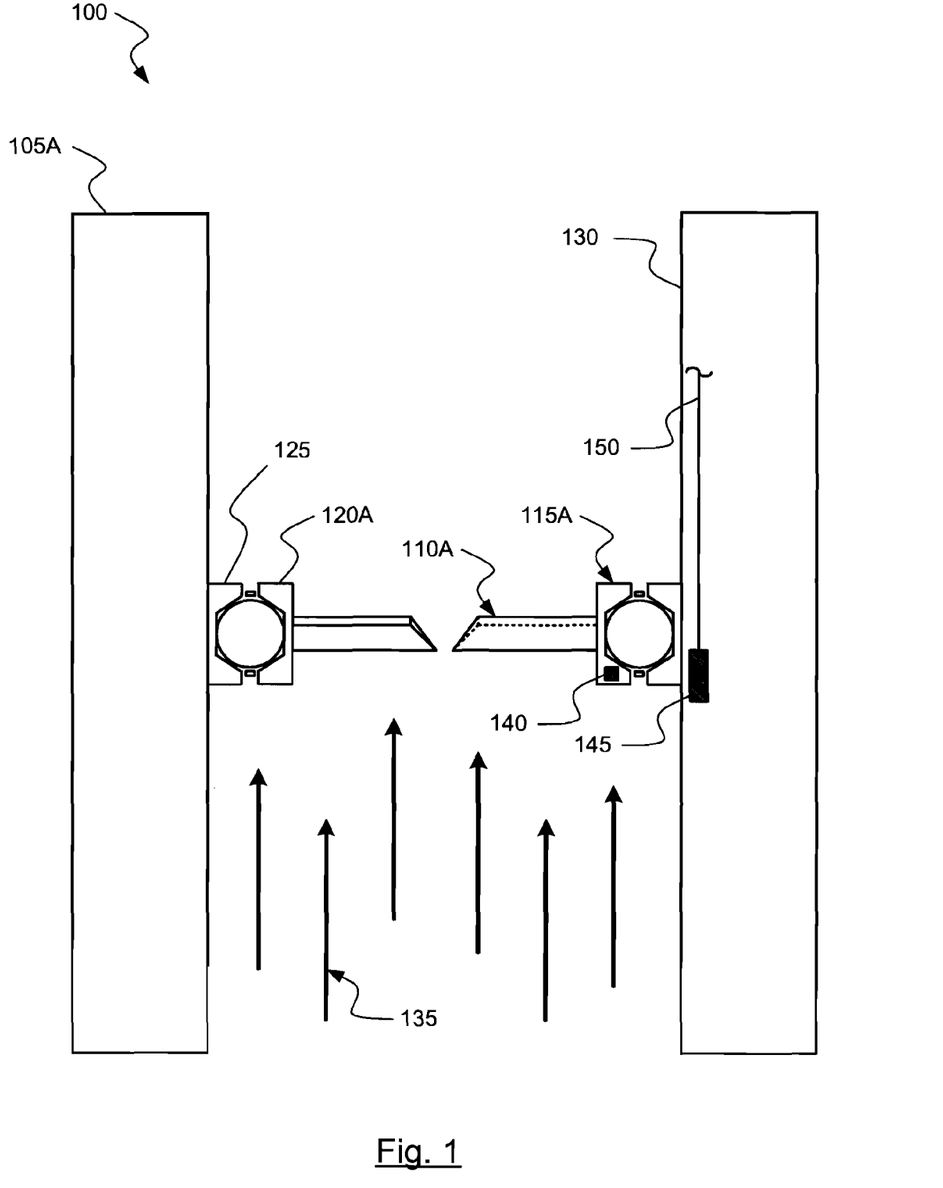
FIG. 1 is a side cut-away view of an embodiment of the invention for determining at least one property of a fluid flow through a conduit having rigid blade members and an exposed bearing.

Turning now to FIG. 1, a side cut-away view of an embodiment 100 of the invention for determining at least one property of a fluid flow through a conduit 105A having rigid blade members 110A and an exposed bearing 115A is shown.

In embodiment 100, rigid blade members 110A may be fixedly coupled with bearing 115A. Bearing 115A includes an inner race 120A, where rigid blade members 110A are fixedly coupled, and an outer race 125. Though shown in embodiment 100 as a ball bearing, bearing 115A may be or include any type of bearing known in the art as discussed herein.

Outer race 125 of bearing 115A may be fixedly coupled with an inner surface 130 of conduit 105A. In this manner, fluid flow, generally represented by directional arrows 135 (hereinafter fluid flow 135), may cause blade members 110A to rotate. The rotation of blade members 110A may be received by inner race 120A.

Inner race 120A may include at least one magnet 140 or other detectable component which can be detected as it rotates past a Hall sensor 145. Hall sensor 145 may send a signal via connection 150 to a system which may determine a rate of rotation of the rotational motion of the rigid blade members 110A. From the rate of rotation, the system may determine at least one property of the fluid flow based at least in part on the rate of rotation.

Figure 2:
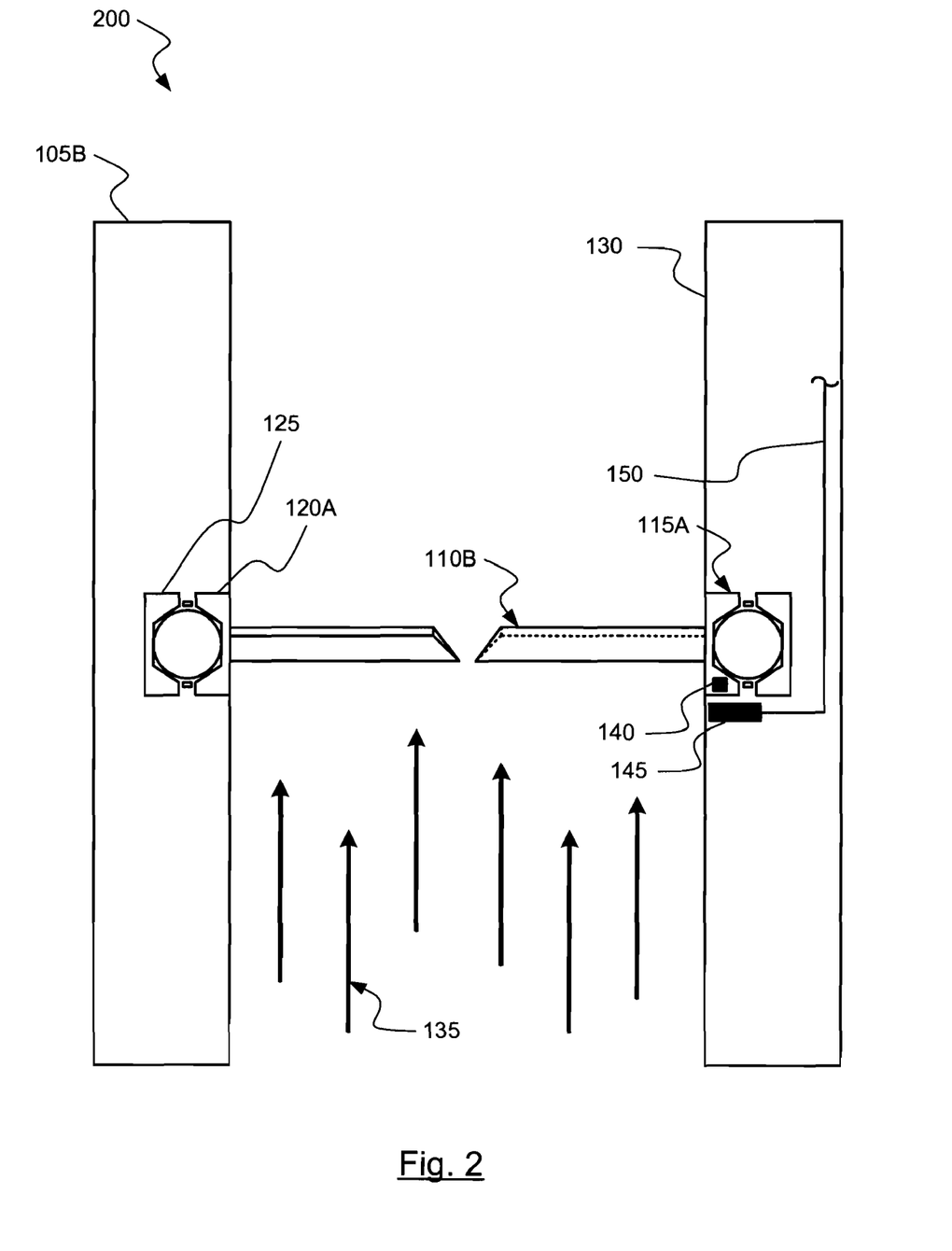
FIG. 2 is a side cut-away view of another embodiment of the invention for determining at least one property of a fluid flow through a conduit, similar to FIG. 1, except having a recessed bearing.

FIG. 2 shows a side cut-away view of another embodiment 200 of the invention for determining at least one property of a fluid flow 135 through conduit 105A, similar to FIG. 1, except having a recessed bearing 115A. Embodiment 200 functions in a substantially similar manner to embodiment 100, except in embodiment 200, bearings 115A are recessed into inner surface 130 of conduit 105A. Embodiment 200 may at least assist in protecting bearing 115A from the force and/or material composition of fluid flow 135. Rigid blade members 110B may also be longer than rigid blades 110A from embodiment 100, possibly to maintain and/or increase sensitivity to fluid flow 135.

Figure 3A:
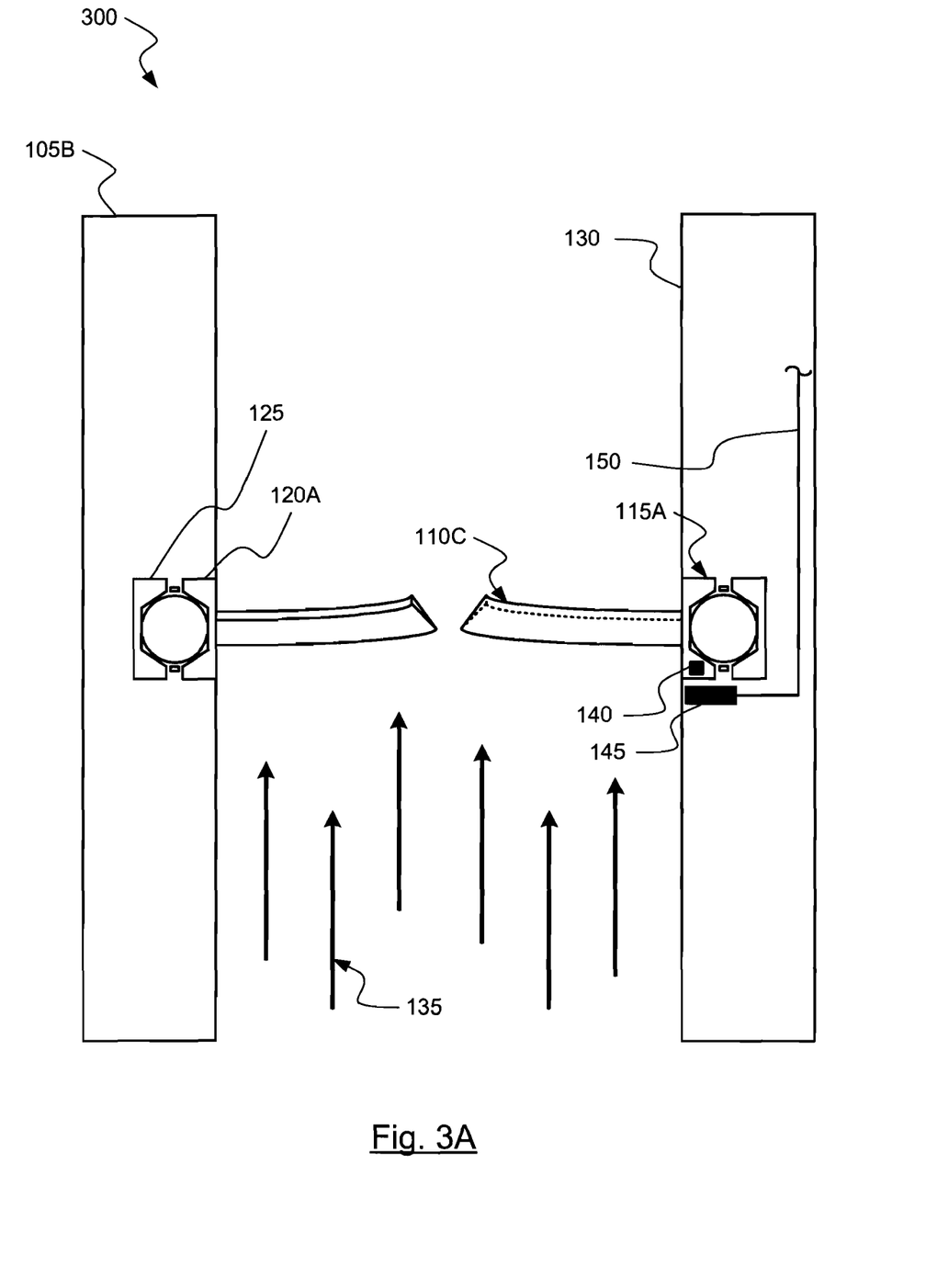
FIG. 3A is a side cut-away view of an embodiment of the invention for determining at least one property of a fluid flow through a conduit, similar to FIG. 2, except having flexible blade members.

FIG. 3A shows a side cut-away view of an embodiment 300 of the invention for determining at least one property of a fluid flow 135 through a conduit 105B, similar to FIG. 2, except having flexible blade members 110C. In this embodiment 300, flexible blade members 110C are shown as deformed from an initial/default position under the force/pressure of fluid flow 135. Such deformation may be accounted for in fluid flow property determination calculations by calibration of the system which receives signals from Hall sensor 145.

Figure 3B:
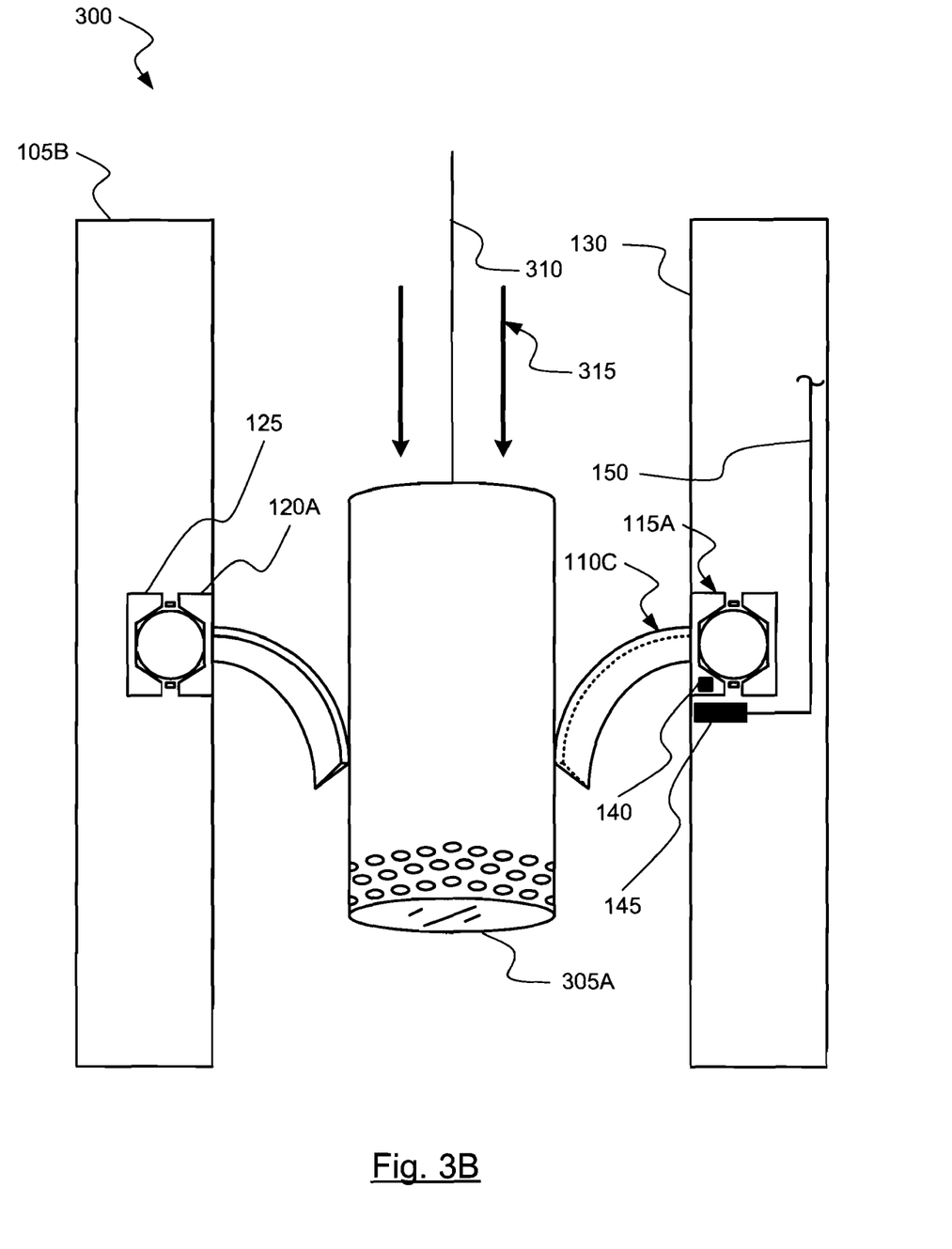
FIG. 3B is a side cut-away view of the embodiment shown in FIG. 3A, except showing the flexible blade members displaced by a through-conduit object.

FIG. 3B shows a side cut-away view of the embodiment 300 shown in FIG. 3A, except showing flexible blade members 110C displaced by a through-conduit object 305A. In this embodiment 300, a through-conduit object 205A of smaller size than the bore of conduit 105B, for example a wire-line tool, a perforating tube, an intervention tool, or measurement tool, may be lowered by wire-line 310, or otherwise moved through conduit 105B, thereby displacing flexible blade members 110C.

As through-conduit object 305A is lowered by wire-line 310 in the direction of arrows 315, flexible blade members 110C may be displaced to allow through-conduit object 305A to pass. After through-conduit object 305A has passed through flexible blade members 110C, flexible blade members 110C may return to their initial/default position.

Flexible blade members 110C may be shaped and/or sized to allow wire-line 310 to project, unobstructed through the plane of the initial/default position of flexible blade members 110C in their initial/default positions, and possibly their positions during rotation and determination of properties of fluid flow 135. After operation of through-conduit object 305 is complete, through-conduit object 305 may be retrieved by pulling of wire-line 310 to retrieve through-conduit object 305 via reverse direction deformation of flexible blade members 110C.

Figure 4A:
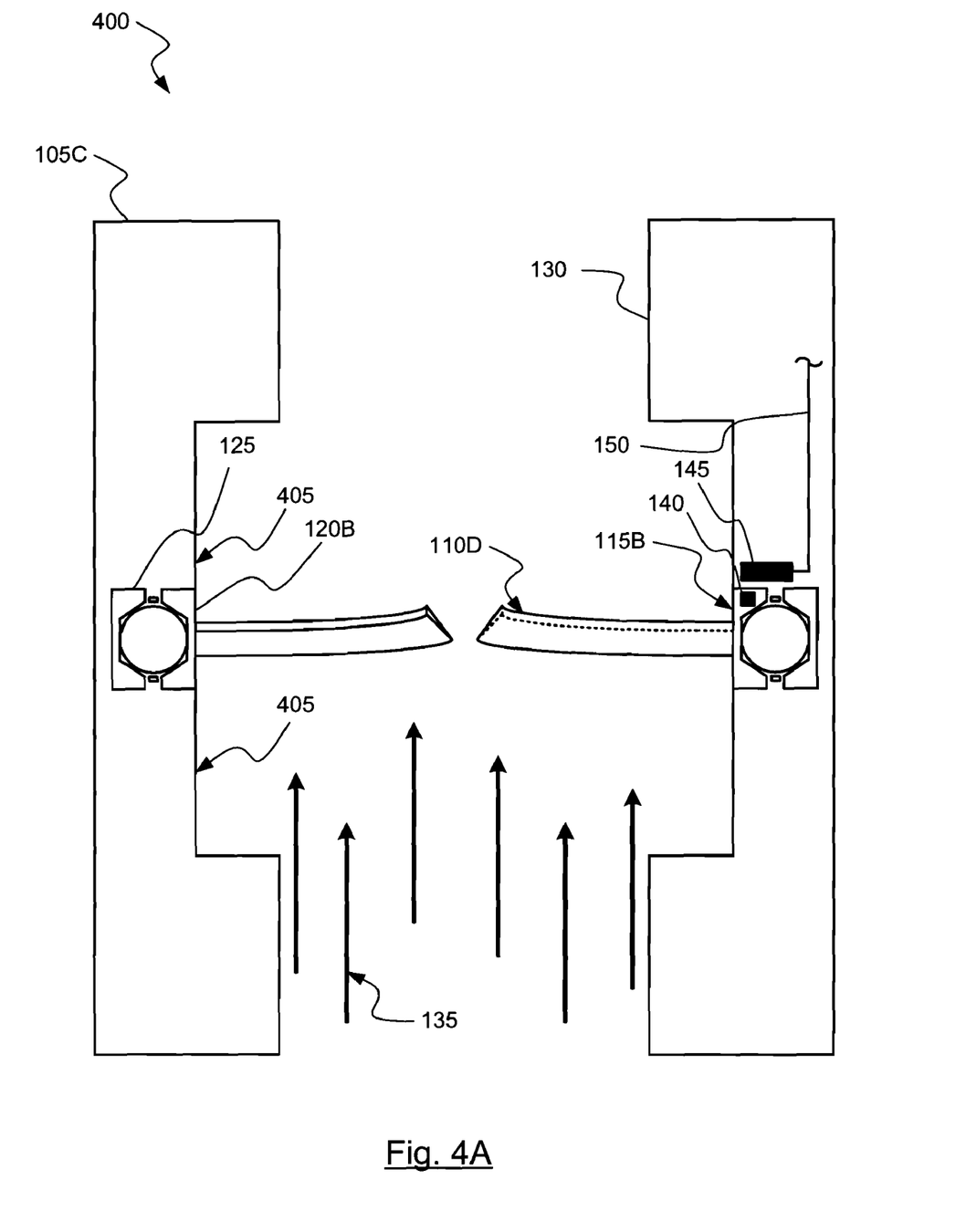
FIG. 4A is a side cut-away view of an embodiment of the invention for determining at least one property of a fluid flow through a conduit, similar to FIG. 3A, except having annular cavities in proximity to the flexible blade members.

FIG. 4A shows a side cut-away view of an embodiment 400 of the invention for determining at least one property of a fluid flow 135 through a conduit 105C, similar to FIG. 3A, except having annular cavities 405 in proximity to flexible blade members 110D. Annular cavities 405 may allow more displacement of flexible blade members 110D when larger through-conduit objects 305 are moved through conduit 105C.

In this embodiment 400, flexible blade members 110D are shown as deformed from an initial/default position under the force/pressure of fluid flow 135. As in previous embodiments, such deformation may be accounted for in fluid flow property determination calculations by calibration of the system which receives signals from Hall sensor 145.

Figure 4B:
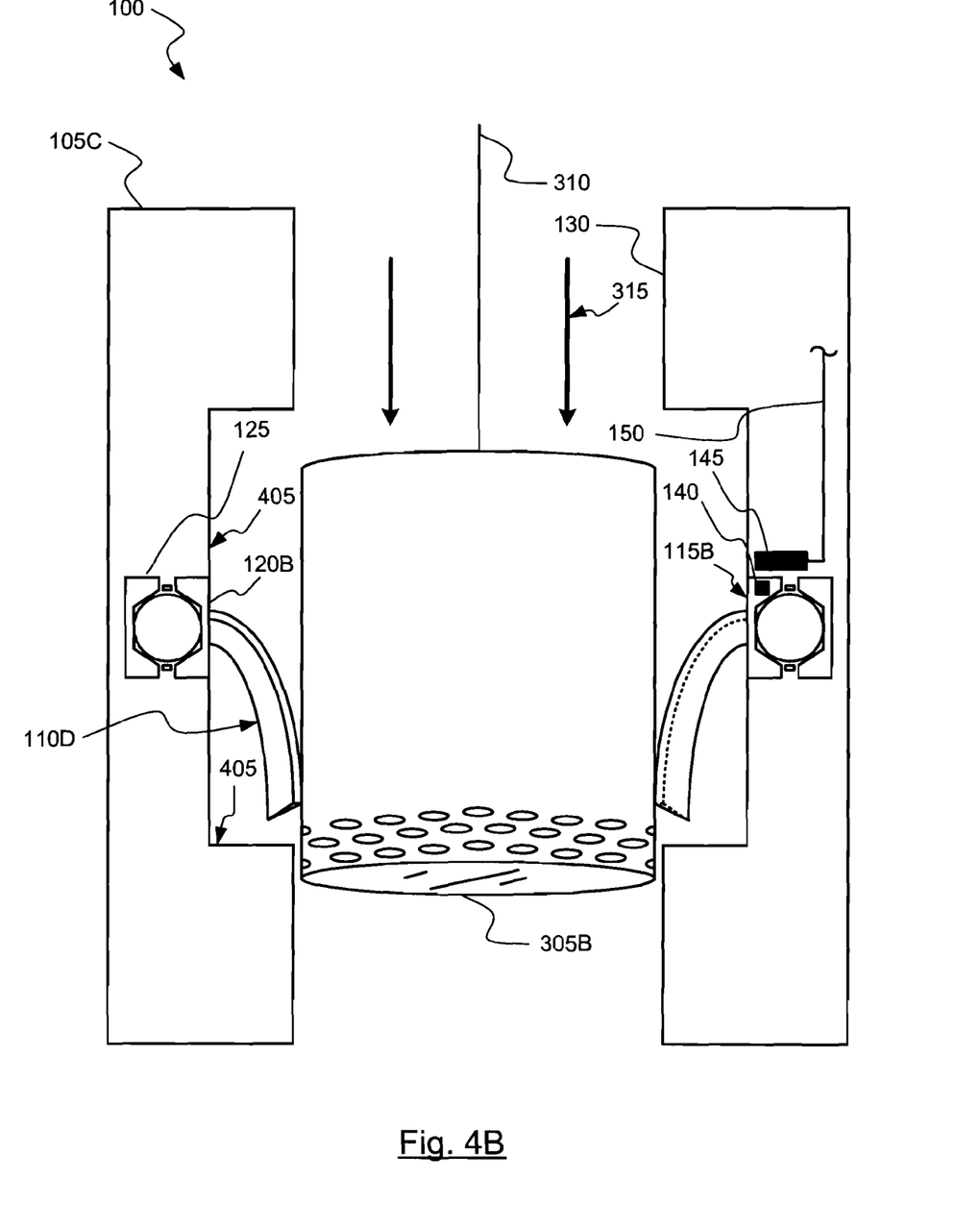
FIG. 4B is a side cut-away view of the embodiment shown in FIG. 4A, except showing the flexible blade members displaced by a through-conduit object having a width substantially the same diameter as the conduit.

FIG. 4B shows a side cut-away view of the embodiment 400 shown in FIG. 4A, except showing flexible blade members 110D displaced by a through-conduit object 305B having a width substantially the same diameter as conduit 105C. In this embodiment 400, a through-conduit object 205B of a size substantially equal to the bore of conduit 105C may be lowered by wire-line 310, or otherwise moved through conduit 105C, thereby displacing flexible blade members 110C into annular cavities 405.

As through-conduit object 305B is lowered by wire-line 310 in the direction of arrows 315, flexible blade members 110D may be displaced into annular cavities 405 to allow through-conduit object 305B to pass. After through-conduit object 305B has passed through flexible blade members 110D, flexible blade members 110D may return to their initial/default position.

Flexible blade members 110D may be shaped and/or sized to allow wire-line 310 to project, unobstructed through the plane of the initial/default position of flexible blade members 110D in their initial/default positions, and possibly their positions during rotation and determination of properties of fluid flow 135. After operation of through-conduit object 305 is complete, through-conduit object 305 may be retrieved by pulling of wire-line 310 to retrieve through-conduit object 305 via reverse direction deformation of flexible blade members 110D into annular cavities 405 on the other side of bearing 115B.

Figure 5A:
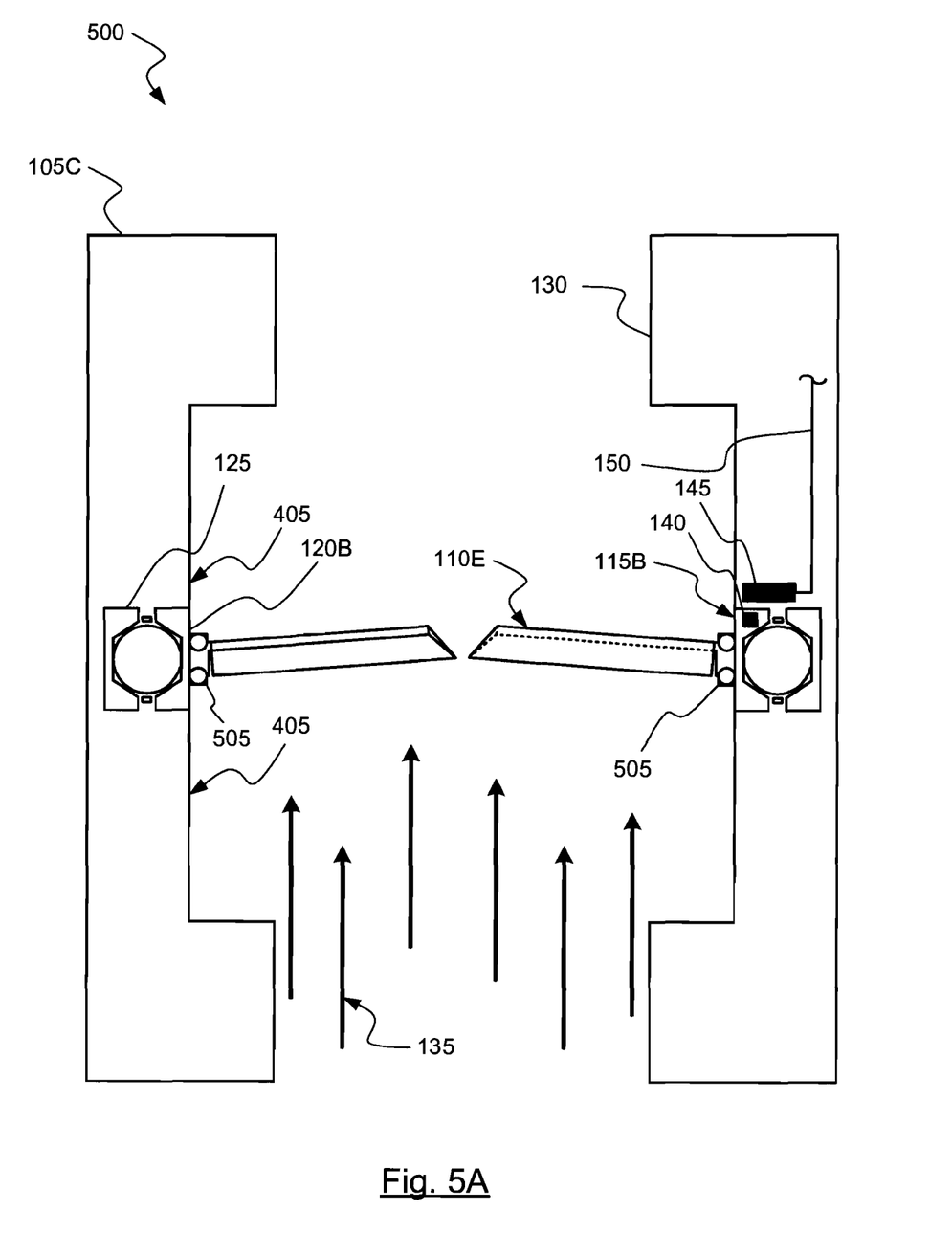
FIG. 5A is a side cut-away view of an embodiment of the invention for determining at least one property of a fluid flow through a conduit, similar to FIG. 4A, except having rigid blade members coupled with the bearings via double action spring hinges.

FIG. 5A shows a side cut-away view of an embodiment 500 of the invention for determining at least one property of a fluid flow through a conduit 105C, similar to FIG. 4A, except having rigid blade members 110E coupled with bearing 115B via double action spring hinges 505. Annular cavities 405 may allow more displacement of flexible blade members 110E when larger through-conduit objects 305 are moved through conduit 105C.

In this embodiment 500, rigid blade members 110E are shown as hingedly rotated from an initial/default position under the force/pressure of fluid flow 135. As in previous embodiments, such displacement may be accounted for in fluid flow property determination calculations by calibration of the system which receives signals from Hall sensor 145.

Figure 5B:
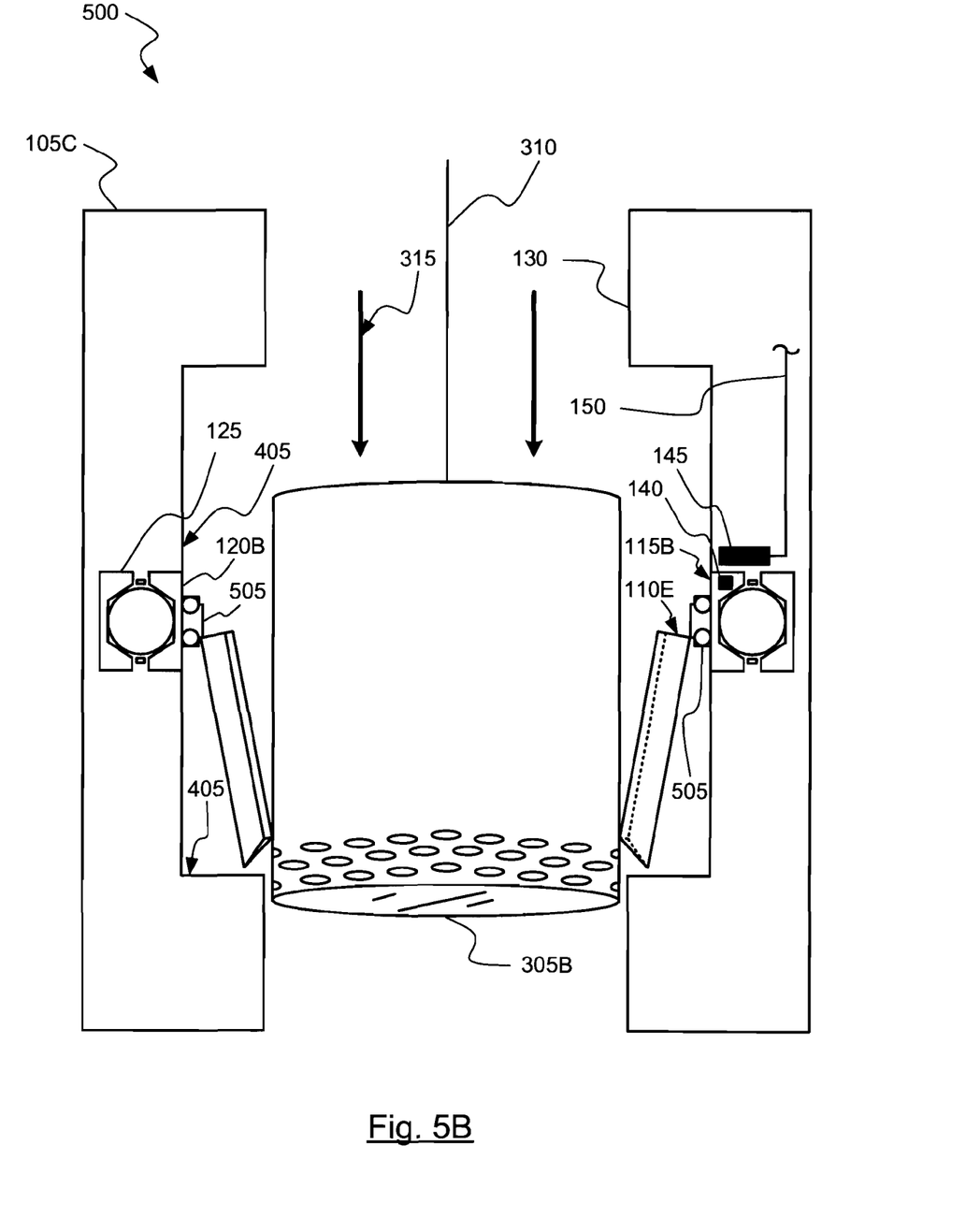
FIG. 5B is a side cut-away view of the embodiment shown in FIG. 5A, except showing the rigid blade members displaced by a through-conduit object having a width substantially the same diameter as the conduit.

FIG. 5B show a side cut-away view of the embodiment 500 shown in FIG. 5A, except showing the rigid blade members 110E displaced by a through-conduit object having a width substantially the same diameter as conduit 105C. In this embodiment 500, a through-conduit object 205B of a size substantially equal to the bore of conduit 105C may be lowered by wire-line 310, or otherwise moved through conduit 105C, thereby displacing rigid blade members 110E into annular cavities 405.

As through-conduit object 305B is lowered by wire-line 310 in the direction of arrows 315, rigid blade members 110E may be displaced into annular cavities 405 to allow through-conduit object 305B to pass. After through-conduit object 305B has passed through and displaced rigid blade members 110E, rigid blade members 110E may return to their initial/default position under the urging of the spring in the double action spring hinges 505.

Rigid blade members 110E may be shaped and/or sized to allow wire-line 310 to project, unobstructed through the plane of the initial/default position of rigid blade members 110E in their initial/default positions, and possibly their positions during rotation and determination of properties of fluid flow 135. After operation of through-conduit object 305 is complete, through-conduit object 305 may be retrieved by pulling of wire-line 310 to retrieve through-conduit object 305 via reverse direction displacement of rigid blade members 110E into annular cavities 405 on the other side of bearing 115B.

Figure 6:
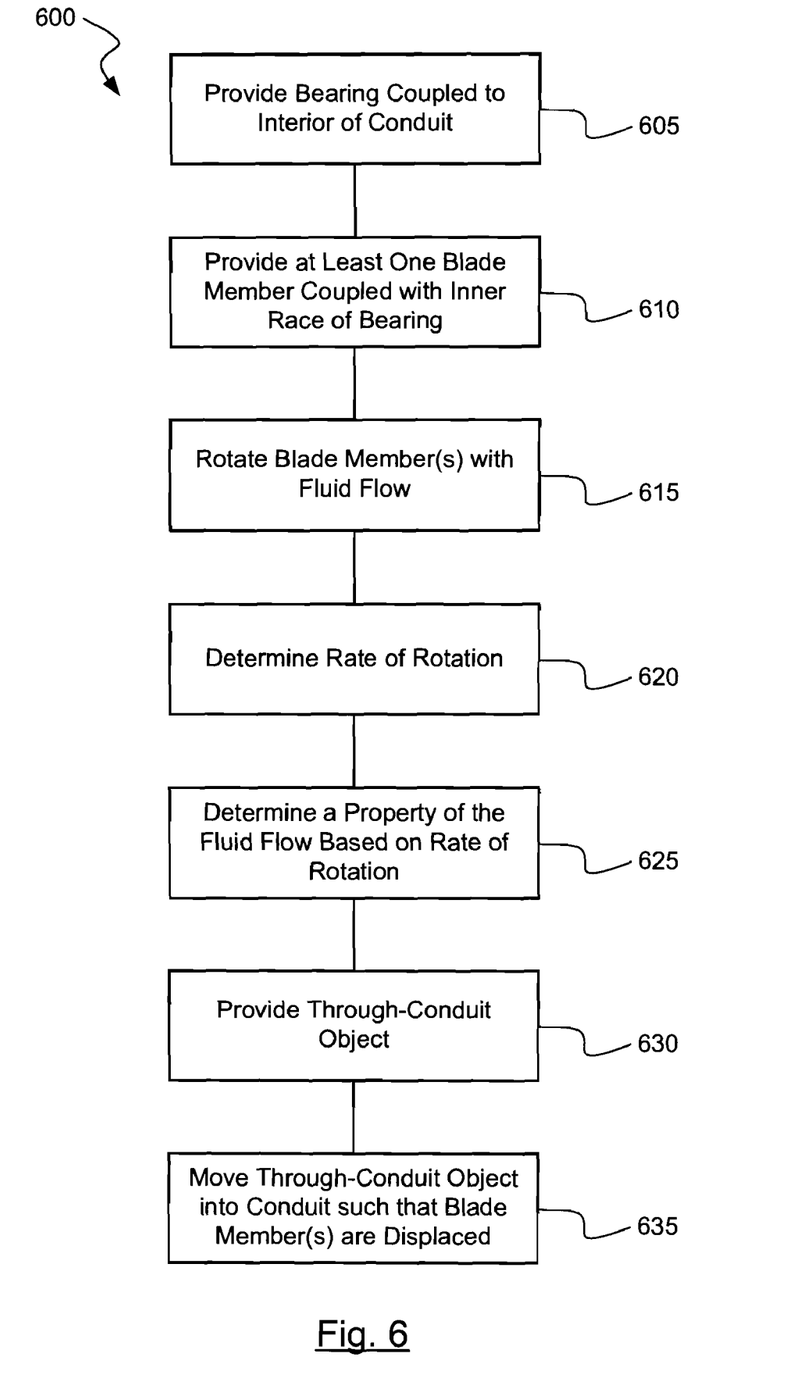
FIG. 6 is a block diagram of a method of the invention for determining at least one property of a fluid flow through a conduit.

FIG. 6 shows a block diagram of a method 600 of the invention for determining at least one property of a fluid flow 135 through a conduit 105. At block 605, a bearing 115 is provided. Bearing 115 may be coupled with an interior of conduit 105, possibly via an outer race 125 and may have an inner race 120.

At block 610, at least one blade member 110 may be provided, which may be coupled with the inner race 120 of bearing 115. Blade member(s) 110 may extend from inner race 120 toward the interior of conduit 105.

At block 615, blade member(s) 110 may be rotated with a fluid flow 135 through conduit 105. At block 620, a rate of rotation of blade member(s) 110 may be determined, possibly with a transducer.

At block 625, a property of the fluid flow 135 may be determined based at least in part on the determined rate of rotation from block 620. At block 630, a through-conduit object 305 may be provided. At block 635, through-bore object 305 may be moved through conduit 105 such that blade member(s) 110 are displaced.

The invention has now been described in detail for the purposes of clarity and understanding. However, it will be appreciated that certain changes and modifications may be practiced within the scope of the appended claims.

What is claimed is:

1. A system for determining at least one property of a fluid flow through a conduit, wherein the system comprises:
    a bearing, wherein:
        the bearing is coupled with an interior of the conduit; and
        the bearing comprises an inner race, wherein the inner race rotates with respect to the conduit;
    at least one blade member, wherein:
        the at least one blade member is coupled with the inner race of the bearing;
        the at least one blade member extends from the inner race of the bearing toward the interior of the conduit;
        the at least one blade member rotates with respect to the conduit when a fluid flows through the interior of the conduit; and
        the inner race of the bearing rotates with respect to the conduit when the at least one blade member rotates; and
    a monitoring device, wherein the monitoring device is configured to determine a rate of rotation of the at least one blade member with respect to the conduit, and wherein at least one property of the fluid flow may be determined based at least in part on the rate of rotation of the at least one blade member with respect to the conduit.

2. The system of claim 1, wherein the at least one property of the fluid flow comprises a flow rate.

3. The system of claim 1, wherein the bearing further comprises an outer race, and the bearing being coupled with the interior of the conduit comprises the outer race of the bearing being coupled with the interior of the conduit.

4. The system of claim 1, wherein the at least one blade member comprises at least one blade member of a flexible material.

5. The system of claim 1, wherein the at least one blade member being coupled with the inner race of the bearing comprises at least one of the blade members being hingedly coupled with the inner race of the bearing.

6. The system of claim 1, wherein the system further comprises a double action spring hinge, and wherein the at least one blade member being coupled with the inner race of the bearing comprises a blade member being coupled with the double action spring hinge, and the double action spring hinge being coupled with the inner race of the bearing.

7. The system of claim 1, wherein:
    the at least one blade member comprises at least one blade member of a flexible material;
    the conduit at least partially defines at least one annular cavity in proximity to the at least one blade member; and
    the at least one blade member is configured to flex into at least a portion of the at least one annular cavity.

8. The system of claim 1, wherein:
    the at least one blade member being coupled with the inner race of the bearing comprises at least one of the blade members being hingedly coupled with the inner race of the bearing;
    the conduit at least partially defines at least one annular cavity in proximity to the at least one blade member; and
    the at least one blade member is configured to rotate about at least one hinge into at least a portion of the at least one annular cavity.

9. The system of claim 1, wherein:
    the at least one blade member comprises at least two blade members;
    the conduit defines a bore having a first diameter; and
    the at least two blade members are configured to be at least partially displaced from an initial position such that a circle between the at least two blade members, lying in a plane perpendicular to the bore, has a second diameter greater than or substantially equal to the first diameter.

10. A method for determining at least one property of a fluid flow through a conduit, wherein the method comprises:
    providing a bearing having an inner race, wherein the bearing is coupled with an interior of the conduit;
    providing at least one blade member, wherein:
        the at least one blade member is coupled with the inner race of the bearing;
        the at least one blade member extends from the inner race of the bearing toward the interior of the conduit;
    rotating the at least one blade member with the fluid flow through the conduit; and
    determining a rate of rotation of the at least one blade member with respect to the conduit; and
    determining at least one property of the fluid flow based at least in part on the rate of rotation of the at least one blade member with respect to the conduit.

11. The method of claim 10, wherein the method further comprises:
    providing a through-conduit object; and
    moving the through-conduit object into the conduit in a first direction such that at least one blade member is at least temporarily and at least partially displaced from an initial position.

12. The method of claim 11, wherein:
    the conduit defines a bore having a first diameter;
    the through-conduit object has a width substantially equal to the first diameter.

13. The method of claim 11, wherein at least one blade member being at least temporarily and at least partially displaced from an initial position comprises at least one blade member flexing.

14. The method of claim 11, wherein at least one blade member being at least temporarily and at least partially displaced from an initial position comprises at least one blade member rotating about at least one hinge.

15. The method of claim 11, wherein at least one blade member being at least temporarily and at least partially displaced from an initial position comprises at least one blade member being at least partially disposed within an annular cavity at least partially defined by the conduit.

16. A system for determining at least one property of a fluid flow through a conduit, wherein the system comprises:
    a first means for converting a substantially linear motion of the fluid flow to a rotational motion, wherein the first means comprises at least one blade member;

a second means for coupling the first means with an interior of the conduit, wherein the second means comprises a bearing and wherein the at least one blade member is coupled with an inner race of the bearing; and a third means for determining a rate of rotation of the rotational motion, wherein at least one property of the fluid flow may be determined based at least in part on the rate of rotation of the at least one blade member with respect to the conduit.

17. The system of claim 16, wherein the third means comprises a transducer.

18. A method for determining at least one property of a fluid flow through a conduit, wherein the method comprises:

providing a bearing having an inner race, wherein the bearing is coupled with an interior of the conduit;
providing at least one blade member, wherein:
the at least one blade member is coupled with the inner race of the bearing;
the at least one blade member extends from the inner race of the bearing toward the interior of the conduit;
resisting a rotating motion of the at least one blade member resulting from the fluid flow through the conduit; and
determining a torque on the at least one blade member; and
determining at least one property of the fluid flow based at least in part on the determined torque on the at least one blade member.

\* \* \* \* \*